United States Patent [19]

Federkins et al.

[11] Patent Number: 5,123,014
[45] Date of Patent: Jun. 16, 1992

[54] DATA LINK WITH AN IMBEDDED CHANNEL

[75] Inventors: John C. Federkins; Charles L. Whittington, both of Lake Zurich; Hueiming Yang, Naperville, all of Ill.

[73] Assignee: Motorola, Inc., Schaumburg, Ill.

[21] Appl. No.: 486,468

[22] Filed: Feb. 27, 1990

[51] Int. Cl.⁵ .............................................. H04J 3/12
[52] U.S. Cl. .................................. 370/110.1; 379/59; 379/60; 455/33.1
[58] Field of Search ................. 370/110.1, 110.4; 379/63, 59, 60; 455/33, 53, 56

[56] References Cited

U.S. PATENT DOCUMENTS

| | | |
|---|---|---|
| 4,412,324 | 10/1983 | Glowinsky et al. ............ 370/80 |
| 4,630,262 | 12/1986 | Callens et al. ................ 370/81 |
| 4,647,925 | 3/1987 | Osman et al. ............... 370/110.1 |
| 4,701,913 | 10/1987 | Nelson ...................... 370/110.1 |

Primary Examiner—Douglas W. Olms
Assistant Examiner—Dang Ton
Attorney, Agent, or Firm—Wayne J. Egan

[57] ABSTRACT

A method and apparatus for arranging an HDLC data link to transport a special class of data such as, for example, synchronization or other signalling informaiton, in addition to the normal data transported by the data link is provided. According to the invention, at the sending end of the link the all-1's sequence corresponding to the idle sequence between individual HDLC packets is detected. Once eight (8) consecutive 1's are detected, a desired number of 1's is removed and a like number of synchronization bits are inserted in their place. At the receiving end of the link the inserted synchronization bits are detected, removed, and a like number of 1's inserted in their place.

36 Claims, 3 Drawing Sheets

DATA LINK WITH AN IMBEDDED CHANNEL

TECHNICAL FIELD

This application relates to clocking techniques that may be used in cellular radio infrastructure systems and more particular to a method of imbedding an additional channel in an data communications link compliant with the High Level Data Link Control (HDLC) protocol.

BACKGROUND OF THE INVENTION

Figure 1:
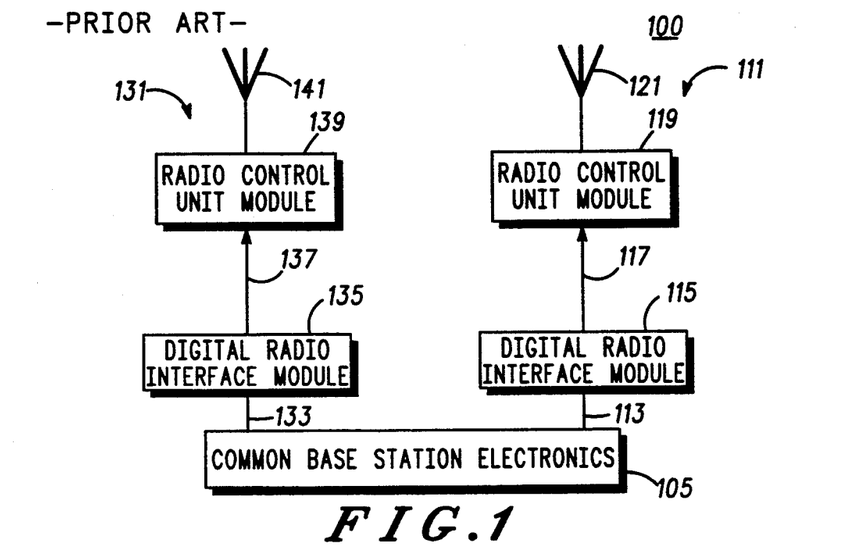
FIG. 1 shows an RF communication system having a plurality of transmitter sites, as in the prior art.

RF communication systems having a plurality of transmitter sites are well known. An example of such a system, of course, is a cellular radio system. Such a system is depicted in FIG. 1. There is shown a cellular radio system 100 having a plurality of transmitter sites, as in the prior art. Although FIG. 1 only depicts two such transmitter sites, 111 and 131, it will be appreciated that the actual number of sites will vary from system to system.

Referring now to transmitter site 111, a common base station 105 is coupled to a digital radio interface module 115 via link 113. The digital radio interface module 115, in turn, is coupled to a radio control unit module 119 via link 117. The radio control unit module 119, in turn, is coupled to an antenna 121.

Referring now to transmitter site 131, the common base station 105 is coupled to a digital radio interface module 135 via link 133. The digital radio interface module 135, in turn, is coupled to a radio control unit module 139 via link 137. The radio control unit module 139, in turn, is coupled to an antenna 141.

Typically the links 117 and 137 are implemented using fiber optic cables. Also, typically these links are arranged as ISO layer 2 HDLC data links.

Referring still to FIG. 1, those skilled in the art will appreciate that the remote radio control unit modules 119 and 139 must be synchronized to a common clocking source in the common base station 105. There are several ways to distribute clocking information to the remote sites. One way would be to run additional fiber optic facilities from the serving digital radio interface modules. The problem with this approach is the added cost for providing the additional fiber optic link for each transmitter site. Considering the length of each link and the total number of sites, this approach may prove expensive.

As a result, it would be desirable to arrange each individual data link to transport the needed synchronization information along with the data information transported by the HDLC protocol.

SUMMARY OF THE INVENTION

It is an object of the invention, therefore, to provide a method for a channel to send and receive imbedded bits. These imbedded bits are arranged to transport further information in addition to the data transported by the data link protocol that is running on the channel.

Therefore, a data link with the imbedded channel, according to the invention is disclosed. At the sending end of the link, an all-1's pattern corresponding to the idle sequence between successive HDLC-type frames is detected. Once a predetermined number of 1's are detected, a desired number of bits are encoded and inserted (or imbedded) into the idle bit sequence. The imbedded bits may be utilized to transport additional information such as, for example, control, signalling, timing, synchronization, data, text, or other information. At the receiving end of the link, the imbedded bits are detected and recovered from the idle sequence.

BRIEF DESCRIPTION OF THE DRAWINGS

FIGS. 5A and 5B are flow diagrams depicting a further embodiment of the invention.

DETAILED DESCRIPTION OF THE INVENTION

Figure 2:
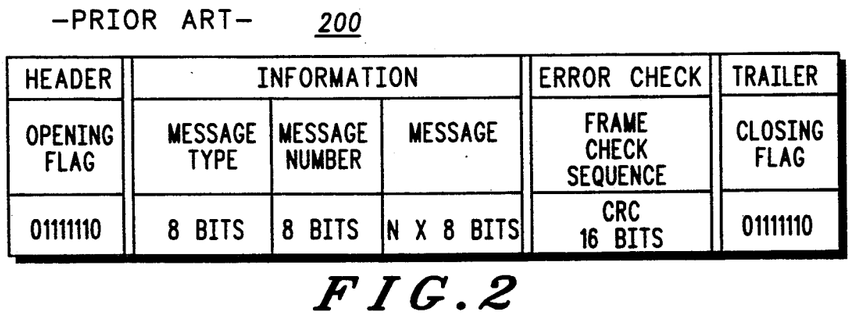
FIG. 2 shows a typical HDLC frame format, as in the prior art.

As above, the channel interconnecting the digital radio interface and the radio control unit has an HDLC-type data link implemented on it. The frame format of the HDLC protocol is well-known and is shown in FIG. 2. The header and trailer are the standard HDLC opening and closing flags and operate in the non-shared mode. The information field contains a message type, a message number, and the message to be transported by the frame. As is known, the idle time between messages is filled with a predetermined idling sequence comprising "all ones" or "all 1's".

In addition to the data contained in the HDLC frame, the applicant has discovered that the digital radio interface may be arranged to transmit other information to the radio control unit via this channel by encoding and sending embedded bits during the idle sequence that occurs between successive HDLC frames.

In particular, the applicant has discovered that the digital radio interface may utilize the foregoing technique to transport synchronization or timing information to the radio control unit. In what follows, therefore, it will be assumed that the imbedded bits are used to transport such timing or synchronization signals. Those skilled in the art will appreciate, however, that the invention is equally applicable in applications where the imbedded information sought to be transported relates to other purposes such as, for example, control, signalling, data, text, or still other uses.

To achieve proper synchronization, therefore, the data radio interface encodes a predetermined bit pattern and transmits it to the radio control unit via the link. This timing information is transmitted during the link idle time after the last set of messages have been transmitted but before the next set of messages is transmitted. This timing information is not framed by the HDLC opening/closing flags, and is therefore ignored by the HDLC receiver. This is illustrated in FIG. 3.

Figure 3:
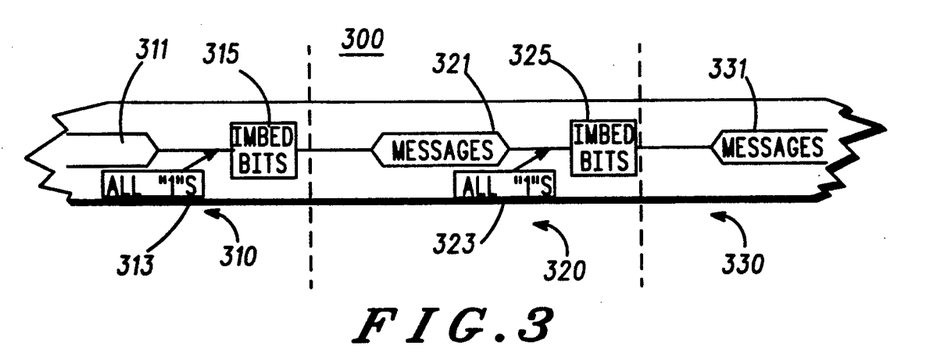
FIG. 3 is a timing diagram depicting a first embodiment of a data link with an imbedded channel, according to the invention.

In FIG. 3 there is shown a time sequence of three consecutive frames comprising a previous frame 310, a current frame 320, and a next (or following) frame 330.

Looking now at the current frame 320, note that after all current messages 321 have terminated, the channel reverts to an "all 1's" sequence 323. It is during this condition 323 that the imbedded bits (designated "IMBED BITS") 325 carrying the timing information are inserted.

The previous frame 310 and the next frame 330 exhibit a similar pattern. For instance, note that the previous frame 310 contains several imbedded bits 315 that follow an "all 1's" sequence 313. Similarly, it may be assumed that the next frame 330 also contains a sequence of imbedded bits, although this is not shown.

Referring still to FIG. 3, each imbedded bit sequence conveys a timing signal or mark used for synchronizing the corresponding frame. In the current system, seven individual timing marks are used. As a result, seven individual bit patterns are required. The correspondence of the imbedded bit patterns to the seven timing signals is shown in Table 1, below:

TABLE 1

| Information | Imbedded Bit Pattern |
|---|---|
| Timing Mark 1 | 1111111100001111111 |
| Timing Mark 2 | 1111111100011111111 |
| Timing Mark 3 | 1111111100101111111 |
| Timing Mark 4 | 1111111100111111111 |
| Timing Mark 5 | 1111111101001111111 |
| Timing Mark 6 | 1111111101011111111 |
| Timing Mark 7 | 1111111101101111111 |

These bit patterns are chosen to assure that the HDLC receiver will not mistake the synchronization information for an opening flag, closing flag, or data corresponding to the HDLC frame structure of FIG. 2. Those skilled in the art will appreciate that, since the HDLC protocol is utilized as the link-level data transmission format, it is guaranteed that the bit patterns in Table 1 above will never appear in the HDLC data stream. This arrangement, therefore, eliminates the need for any type of receive gate or "window" through which to detect or "watch for" the timing mark.

Figure 4:
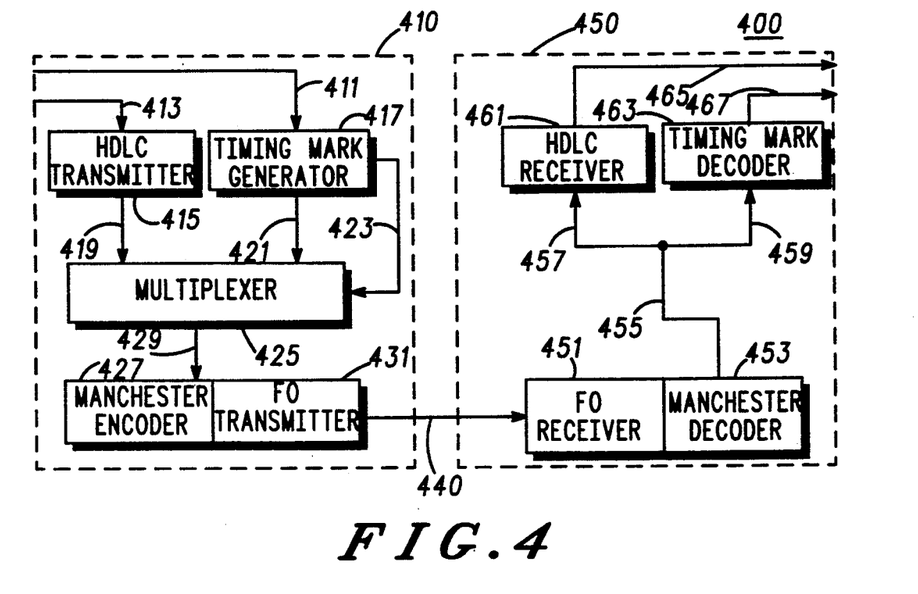
FIG. 4 is a block diagram depicting a further embodiment of the invention.

FIG. 4 shows a digital radio interface module 410 coupled to a remote radio control unit module 450 via a fiber optic cable 440.

The module 410 accepts the data input 413 and the timing input 411 from the common base station electronics, such as that depicted as 105 in FIG. 1. The data is converted into an HDLC format 419 via the HDLC transmitter 415. The synchronized timing information 411 is converted into its transmission format 421 (as per Table 1) via the timing mark generator 417. This information is then combined through a multiplexer 425 and applied to a manchester encoder 427 which supplies the fiber optic transmitter 431 which, in turn, drives the fiber optic cable 440.

At the receiving end of cable 440, the signal is received by fiber optic receiver 451 which is coupled to a manchester decoder 453. The decoder 453's output 455 is split into two branches 457 and 459. Branch 457 is input to an HDLC receiver 461, and branch 459 is input to timing mark decoder 463.

Referring still to module 450, the HDLC receiver 461 scans its input bit stream 457 for opening flags. When one is found, it converts the following bits from the HDLC frames to the user output data stream 465. In parallel with the foregoing HDLC decoding process, the timing mark decoder 463 also scans its input bit stream 459 for timing information, as per Table 1.

FIG. 5A depicts a flow diagram for an encoding process. The process begins at step 501, and then proceeds to step 503, where it determines whether the HDLC closing flag for the last message in the current frame has been sent. If the flag has not been sent (corresponding to a negative determination for step 503), then the process waits until the flag is sent (corresponding to a positive determination for step 503).

Once the closing flag has been sent, the process proceeds to step 505. Here it determines whether at least eight (8) consecutive 1's have been sent. If at least eight (8) consecutive 1's have not been sent (corresponding to a negative determination for step 505), then the process waits until at least eight (8) consecutive 1's have been sent (corresponding to a positive determination for step 505).

Once at least eight (8) consecutive 1's have been sent, the process proceeds to step 507. Here it removes a predetermined number of 1's and inserts (or imbeds) a like number of synchronization bits. As mentioned above, it will be appreciated that the inserted bits may be used to transport other information, as well, such as signalling or control information.

The bit pattern of the imbedded bits may vary from application to application. Some valid bit patterns are given, for example, in Table 1 above. In encoding the imbedded message bits, however, care must be exercised to avoid inadvertently generating the HDLC "flag" pattern, 01111110. The reason for this, of course, is that this bit pattern would cause the HDLC receiver to erroneously interpret the imbedded message as the beginning of the next HDLC message.

After the desired message bits have been imbedded, the encoding process is complete for the current frame. As a result, the process returns (step 509) to step 501, where it waits for the next frame.

FIG. 5B depicts a flow diagram for a decoding process. The process begins at step 551, and then proceeds to step 553, where it determines whether the HDLC closing flag for the last message in the current frame has been received. If the flag has not been received (corresponding to a negative determination for step 553), then the process waits until the flag is received (corresponding to a positive determination for step 553).

Once the closing flag has been received, the process proceeds to step 555. Here it determines whether at least eight (8) consecutive 1's have been received. If at least eight (8) consecutive 1's have not been received (corresponding to a negative determination for step 555), then the process waits until at least eight (8) consecutive 1's have been sent (corresponding to a positive determination for step 555).

Once at least eight (8) consecutive 1's have been received, the process proceeds to step 557. Here it detects and decodes the imbedded message bits. After the desired message bits have been decoded, the decoding process is complete for the current frame. As a result, the process returns (step 559) to step 551, where it waits for the next frame.

As before, other methods for accomplishing synchronization generally have required a receive gate or "window" to be opened when the timing information is expected, since its timing mark may occur anywhere in the data stream. Therefore, one benefit of a data link with an imbedded channel, according to the invention, is that no receive gate or "window" is required since the timing mark bit pattern cannot occur in the HDLC formatted stream.

Figure 6:
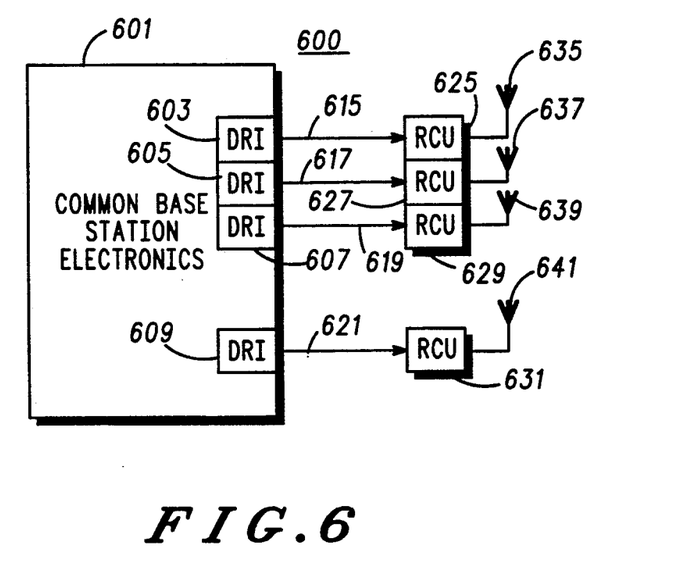
FIG. 6 is a block diagram depicting a further embodiment of the invention.

Referring now to FIG. 6 there is shown a communications system 600 including four remote transmitter sites. There is shown a common base station equipment 501 including four digital radio interface modules 603, 605, 607, and 609. As shown, each digital radio interface module (603, 605, 607, and 609) drives a channel (615, 617, 619, and 621) coupled to a remote radio control unit module (625, 627, 629, and 631). Also as shown, each radio control unit module (625, 627, 629, and 631) drives an antenna (625, 637, 639, and 641). It will be appreciated that each radio interface module and its corresponding radio control module may be equipped with apparatus similar to FIG. 4.

In accordance with the invention, each radio control unit receives its data and timing information over a single fiber optic link. Since the radio interface modules and radio control modules may be replicated and all radio interface modules (603, 605, 607, and 609) are connected to a common timing reference in the common base station equipment 601, then all radio control units (625, 627, 629, and 631) are thus synchronized.

A further capability of a data link with an imbedded channel, according to the invention, is the ability to utilize the timing marks for control. For example, several of the timing marks of Table 1 may be reserved to implement device-specific control functions. For example, a first mark may be a command to place the radio control unit in a sleep mode to conserve power, while a second mark may be a wake-up command for bringing the radio control unit back on-line when it is needed by the system.

While various embodiments of a data link with an imbedded channel, according to the present invention, have been described hereinabove, the scope of the invention is defined by the following claims.

What is claimed is:

1. A method for transmitting synchronous/asynchronous signals imbedded between channels on a serial data link, where said channels utilize a data link protocol that transmits messages with a beginning bit pattern and a closing bit pattern, and where said channels transmits idle signals between said messages, said method comprising the steps of:
   (a) determining when said closing bit pattern has been transmitted;
   (b) determining when at least a predetermined number of idle signals have been transmitted; and,
   (c) transmitting one or more imbedded signals, said imbedded signals comprising a plurality of imbedded characters, each imbedded character comprising a plurality of imbedded bits, each imbedded bit comprising a single binary digit (0 or 1) that is transmitted between channelized messages and that corresponds to a single unit of information.

2. The method of claim 1 wherein said one or more imbedded signals are based at least in part on said beginning bit pattern.

3. A method for sending synchronous/asynchronous characters imbedded between channels on a serial data link, where said channels utilize a protocol that sends a message, and where said channels sends idle characters after a message has been sent, said method comprising the steps of:
   (a) determining when a message has been sent;
   (b) determining when at least a predetermined number of idle characters have been sent; and,
   (c) sending at least one imbedded character, said imbedded character comprising a plurality of imbedded bits, each imbedded bit comprising a single binary digit (0 or 1) that is transmitted between channelized messages and that corresponds to a single unit of information.

4. The method of claim 3 where said message contains a flag and said at least one imbedded character is based at least in part on said flag.

5. A method for sending synchronous/asynchronous bits imbedded between messages on a channel that is arranged to send frames, the channel being further arranged to send an idle pattern of "all 1's" after each frame, said method comprising the steps of:
   (a) determining when a frame has been sent;
   (b) determining when at least a predetermined number of "1's" have been sent; and
   (c) sending at least one imbedded bit, said imbedded bit comprising a single binary bit (0 or 1) that is transmitted between channelized messages and that corresponds to a single unit of information.

6. The method of claim 5 where said frames include a beginning bit pattern and said at least one imbedded bit is based at least in part on said beginning bit pattern.

7. A method for receiving synchronous/asynchronous characters imbedded between channels on a serial data link, where said channels utilize a data link implemented thereon using a protocol that receives a message, and where said channels receives idle characters after a message has been received, said method comprising the steps of:
   (a) determining when a message has been received;
   (b) determining when at least a predetermined number of idle characters have been received; and,
   (c) receiving at least one imbedded character, said imbedded character comprising a plurality of imbedded bits, each imbedded bit comprising a single binary digit (0 or 1) that is transmitted between channelized messages and that corresponds to a single unit of information.

8. The method of claim 7 where said message contains a flag and said at least one imbedded character is based at least in part on said flag.

9. A method for receiving synchronous/asynchronous signals on a channel that is arranged to receiving frames, the channel being further arranged to received an idle pattern of "all 1's" after each frame, said method comprising the steps of:
   (a) determining when a frame has been receiving;
   (b) determining when at least a predetermined of "1's" have been receiving; and,
   (c) receiving at least one imbedded bit, said imbedded bit comprising a single binary bit (0 or 1) that is transmitted between channelized messages and that corresponds to a single unit of information.

10. The method of claim 9 where said frames include a beginning bit pattern and said at least one imbedded bit is based at least in part on said beginning bit pattern.

11. A receiver for receiving synchronous/asynchronous characters imbedded between channels on a serial data link, where said channels utilize a protocol that receives a message, and where said channels receives idle characters after a message has been received, said receiver comprising:
   message determining means for determining when a message has been received;
   idle determining means responsive to said message determining means for determining when at least a predetermined number of idle characters have been received; and
   means responsive to said idle determining means for receiving at least one imbedded character, said imbedded character comprising a plurality of imbedded bits, each imbedded bit comprising a singe binary digit (0 or 1) that is transmitted between channelized messages and that corresponds to a single unit of information.

12. The receiver of claim 11 where said message contains a flag and said at least one imbedded character is based at least in part on said flag.

13. A receiver for receiving synchronous/asynchronous bits imbedded on a channel that is arranged to receive frames, the channel being further arranged to receive an idle pattern "all 1's" after each frame, said receiver comprising:
frame determining means for determining when a frame has been received;
idle determining means responsive to said frame determining means for determining when at least a predetermined number of "1's" have been received; and,
means responsive to said idle determining means for receiving at least one imbedded bit, said imbedded bit comprising a single binary bit (0 or 1) that is transmitted between channelized messages and that correspnds to a single unit of informaiton.

14. The receiver of claim 13 where said frames include a beginning bit pattern and said at least one imbedded bit is based at least in part on said beginning bit pattern.

15. A radio control unit module including a receiver for receiving synchronous/asynchronous characters imbedded between channels on a serial data link, where said channels utilize a data link implemented thereon using a protocol that receives a message, and where said channels receives idle characters after a message has been received, said receiver comprising:
message determining means for determining when a message has been received;
idle determining means responsive to said message determining means for determining when at least a predetermined number of idle characters have been received; and
means responsive to said idle determining means for receiving at least one imbedded character, said imbedded character comprising a plurality of imbedded bits, each imbedded bit comprising a single binary digit (0 or 1) that is transmitted between channelized messages and that corresponds to a single unit of information.

16. The radio control unit module of claim 15 where said message contains a flag and said at least one imbedded character is based at least in part on said flag.

17. A radio control unit module including a receiver for receiving synchronous/asynchronous bits imbedded on a channel that is arranged to receive frames, the channel being further arranged to receive an idle pattern of "all 1's" after each frame, said receiver comprising:
frame determining means for determining when a frame has been received;
idle determining means responsive to said frame determining means for determining when at least a predetermined number of "1's" have been received; and,
means responsive to said idle determining means for receiving at least one imbedded bit, said imbedded bit comprising a single binary bit (0 or 1) that is transmitted between channelized messages and that corresponds to a single unit of information.

18. The radio control unit of claim 17 where said frames include a beginning bit pattern and said at least one imbedded bit is based at least in part on said beginning bit pattern.

19. A communication system including at least one digital radio interface module coupled to a radio control unit module via a channel, said radio control unit module including a receiver for receiving synchronous/asynchronous characters imbedded between channels on a serial data link, where said channels utilize a data link implemented thereon using a protocol that receives a message, and where said channels receives idle characters after a message has been received, said receiver comprising:
message determining means for determining when a message has been received;
idle determining means responsive to said message determining means for determining when at least a predetermined number of idle characters have been received; and,
means responsive to said idle determining means for receiving at least one imbedded character, said imbedded character comprising a plurality of imbedded bits, each imbedded bit comprising a single binary digit (0 or 1) that is transmitted between channelized messages and that corresponds to a single unit of information.

20. The communications system of claim 19 where said message contains a flag and said at least one imbedded character is based at least in part on said flag.

21. A communication system including at least one digital radio interface module coupled to a radio control unit module via a channel, said radio control unit module including a receiver for decoding synchronous/asynchronous bits imbedded on said channel, said channel arranged to receive frames and an idle pattern of "all 1's" after each frame, said receiver comprising:
frame determining means for determining when a frame has been received;
idle determining means responsive to said frame determining means for determining when at least a predetermined number of "1's" have been received; and,
means responsive to said idle determining means for receiving at least one imbedded bit, said imbedded bit comprising a single binary bit (0 or 1) that is transmitted between channelized messages and that corresponds to a single unit of information.

22. The communicaiton system of claim 21 where said frames inlcude a beginning bit pattern and said at least one imbedded bit is based at least in part on said beginning bit pattern.

23. A receiver for receiving synchronous/asynchronous characters imbedded between channels on a serial data link, where said channels utilize a data link implemented thereon using a protocol that receives a mesage, and where said channels receives a stream of idle characters after a message has been received, said receiver comprising:
a decoder arranged for detecting that a message has been received;
said decoder further arranged for detecting, after said message has been received, that at least a predetermined number of idle characters have been received; and,
said decoder further arranged for detecting, after said at least a predetermined number of idle characters have been received, the presence of at least one imbedded character in said stream of idle characters, said imbedded character comprising a plurality of imbedded bits, each imbedded bit comprising a single binary digit (0 or 1) that is transmitted between channelized messages and that corresponds to a single unit of information.

24. The receiver of claim 23 where said message contains a flag and said at least one imbedded character is based at least in part on said flag.

25. A radio control unit module including a receiver for receiving synchronous/asynchronous characters imbedded between channels on a serial data link, where said channels utilize a data link implemented thereon using a protocol that receives a message, and where said channels receives a stream of idle characters after a message has been received, said receiver comprising:

a decoder arranged for detecting that a message has been received;
said decoder further arranged for detecting, after said message has been received, that at least a predetermined number of idle characters have been received, that at least a predetermined number of idle characters have been received; and,
said decoder further arranged for detecting, after said at least a predetermined number of idle characters have been received, the presence of at least one imbedded character in said stream of idle characters, said imbedded character comprising a plurality of imbedded bits, each imbedded bit comprising a single binary digit (0 or 1) that is transmitted between channelized messages and that corresponds to a single unit of information.

26. The radio control unit module of claim 25 where said message contains a flag and said at least one imbedded character is based at least in part on said flag.

27. A communication system including at least one digital radio interface module coupled to a radio control unit module via a channel, said radio control unit module including a receiver for receiving synchronous/asynchronous characters imbedded on said channel, said channel having a data link implemented thereon using a protocol that receives a message, and where said channel receives a stream of idle characters after a message has been received, said receiver comprising:

a decoder arranged for detecting that a message has been received;
said decoder further arranged for detecting, after said message has been received, that at least a predetermined number of idle characters have been received; and,
said decoder further arranged for detecting, after said at least a predetermined number of idle characters have been received, the presence of at least one imbedded character in said stream of idle characters, said imbedded character comprising a plurality of imbedded bits, each imbedded bit comprising a single binary digit (0 or 1) that is transmitted between channelized messages and that corresponds to a single unit of information.

28. The communications system of claim 27 where said message contains a flag and said at least one imbedded character is based at least in part on said flag.

29. A cellular radio telephone base station including a receiver for receiving synchronous/asynchronous characters imbedded on a channel having a data link implemented thereon using a protocol that receives a message, and where said channel receives idle characters after a message has been received, said receiver comprising:

message determining means for determining when a message has been received;
idle determining means responsive to said message determining means for determining when at least a predetermined number of idle characters have been received; and,
means responsive to said idle determining means for receiving at least one imbedded character, said imbedded character comprising a plurality of imbedded bits, each imbedded bit comprising a single binary digit (0 or 1) that is transmitted between channelized messages and that corresponds to a single unit of information.

30. The cellular radio telephone base station of claim 29 where said message contains a flag and said at least one imbedded character is based at least in part on said flag.

31. A cellular radio telephone system including at least one digital radio interface module coupled to a cellular radio telephone base station via a channel, said cellular radio telephone base station including a receiver for receiving synchronous/asynchronous characters imbedded on said channel, said channel having a data link implemented thereon using a protocol that receives a message, and where said channel receives idle characters after a message has been received, said receiver comprising:

message determining means for determining when a message has been received;
idle determining means responsive to said message determining means for determining when at least a predetermined number of idle characters have been received; and,
means responsive to said idle determining means for receiving at least one imbedded character, said imbedded character comprising a plurality of imbedded bits, each imbedded bit comprising a single binary digit (0 or 1) that is transmitted between channelized messages and that corresponds to a single unit of information.

32. The cellular radio telephone system of claim 31 where said message contains a flag and said at least one imbedded character is based at least in part on said flag.

33. A method for transmitting predetermined messages between successive frames on a channel, where the channel utilizes a data link protocol that transmits frames with a beginning flag bit pattern 01111110 and a closing flag bit pattern 01111110, and where the channel transmits idle bits between frames, the method comprising the steps of:

(a) determining when the closing flag bit pattern 01111110 has been transmitted;
(b) determining when at least a predetermined number of idle bits have been transmitted; and,
(c) transmitting one or more messages chosen from the following group:

| message | bits |
|---|---|
| message 1 | 1111111100001111111 |
| message 2 | 1111111100011111111 |
| message 3 | 1111111100101111111 |
| message 4 | 1111111100111111111 |
| message 5 | 1111111101001111111 |
| message 6 | 1111111101011111111 |
| message 7 | 1111111101101111111 |

34. The method of claim 33 where each message conveys a timing signal or mark.

35. A method for receiving predetermined messages between successive frames on a channel, where the channel utilizes a data link protocol that receives frames with a beginning flag bit pattern 01111110 and a closing flag bit pattern 01111110, and where the channel receives idle bits between frames, the method comprising the steps of:
  (a) determining when the closing flag bit pattern 01111110 has been received;
  (b) determining when at least a predetermined number of idle bits have been received; and,
  (c) receiving one or more messages chosen from the following group:

| message | bits |
|---|---|
| message 1 | 1111111100001111111 |
| message 2 | 1111111100011111111 |
| message 3 | 1111111100101111111 |
| message 4 | 1111111100111111111 |
| message 5 | 1111111101001111111 |
| message 6 | 1111111101011111111 |
| message 7 | 1111111101101111111 |

36. The method of claim 35 where each message conveys a timing signal or mark.

* * * * *

UNITED STATES PATENT AND TRADEMARK OFFICE
CERTIFICATE OF CORRECTION

PATENT NO. : 5,123,014
DATED : June 16, 1992
INVENTOR(S) : John C. Federkins: Charles L. Whittington: Hueiming Yang It is certified that error appears in the above-indentified patent and that said Letters Patent is hereby corrected as shown below:

Column 6, line 40, "received" should be --receive--.

Column 9, lines 18-20, delete the phrase "that at least a predetermined number of idle characters have been received,".

Signed and Sealed this

Thirty-first Day of August, 1993

Attest:

BRUCE LEHMAN

Attesting Officer

Commissioner of Patents and Trademarks